Figure 1:
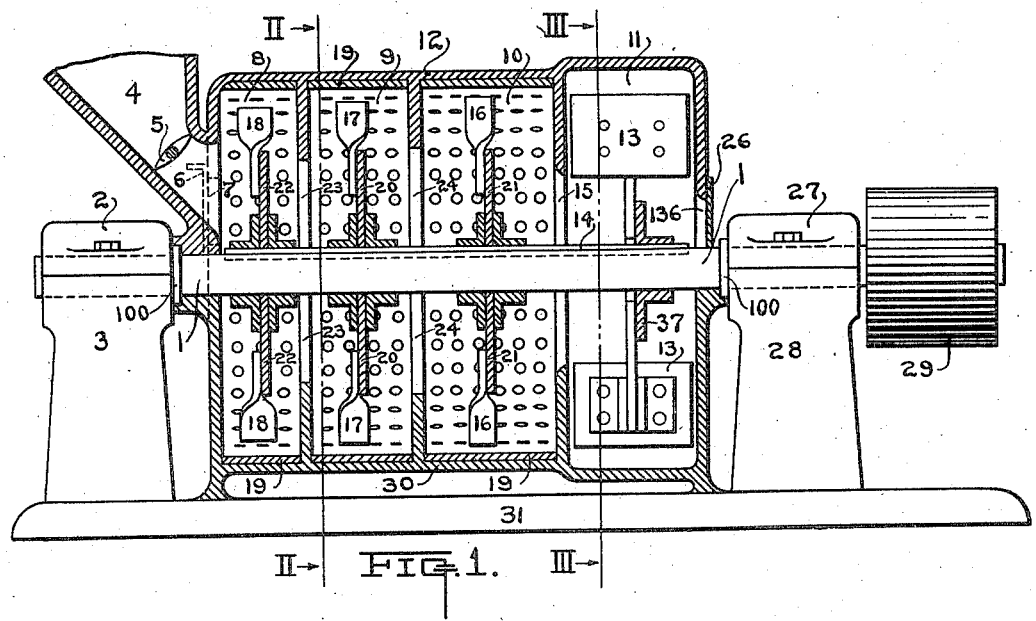

J. H. HIRT.
PULVERIZER.
APPLICATION FILED FEB. 14, 1910.

1,038,886

Patented Sept. 17, 1912.

WITNESSES — Jules H. Hirt  INVENTOR—
BY
ATTORNEY—

UNITED STATES PATENT OFFICE.

JULES H. HIRT, OF EL PASO, TEXAS, ASSIGNOR, BY MESNE ASSIGNMENTS, TO ALLIS-CHALMERS COMPANY, OF MILWAUKEE, WISCONSIN, A CORPORATION OF NEW JERSEY.

PULVERIZER.

1,038,886.  Specification of Letters Patent.  Patented Sept. 17, 1912.

Application filed February 14, 1910. Serial No. 543,722.

*To all whom it may concern:*

Be it known that I, JULES H. HIRT, a citizen of the United States, residing at El Paso, in the county of El Paso and State of Texas, have invented a certain new and useful Improvement in Pulverizers, of which the following is a specification.

This invention relates to improvements in the construction of pulverizers, and particularly to improvements in pulverizers of the type used for reducing solid or liquid fuel, such as coal, coke, oil or similar material to a finely divided state, at the same time thoroughly mixing the finely divided material with an oxidizing agent and holding the mixture in suspension, thereby producing a highly combustible mechanical mixture or mechanical gas.

In using powdered fuel for furnaces, gas producers, and other similar apparatus, it has been found desirable to have the fuel thus used reduced to a finely divided state, and also to have this finely divided fuel thoroughly mixed with air or other oxidizing agent, thus forming a mechanical gas. It has also been found desirable to have under accurate control the quantities of fuel and of oxidizing agent admitted, thus accurately controlling the degree of completeness of combustion. The temperature resulting from exothermic chemical reaction may thus be controlled.

The object of the invention is to provide a pulverizer for solid or liquid fuel which pulverizes the fuel and mixes it with air, both being under delicate control.

A clear conception of the invention as shown in one embodiment thereof can be obtained by referring to the accompanying drawing in which like reference characters designate the same or similar parts in different views.

Figures 2, 3:
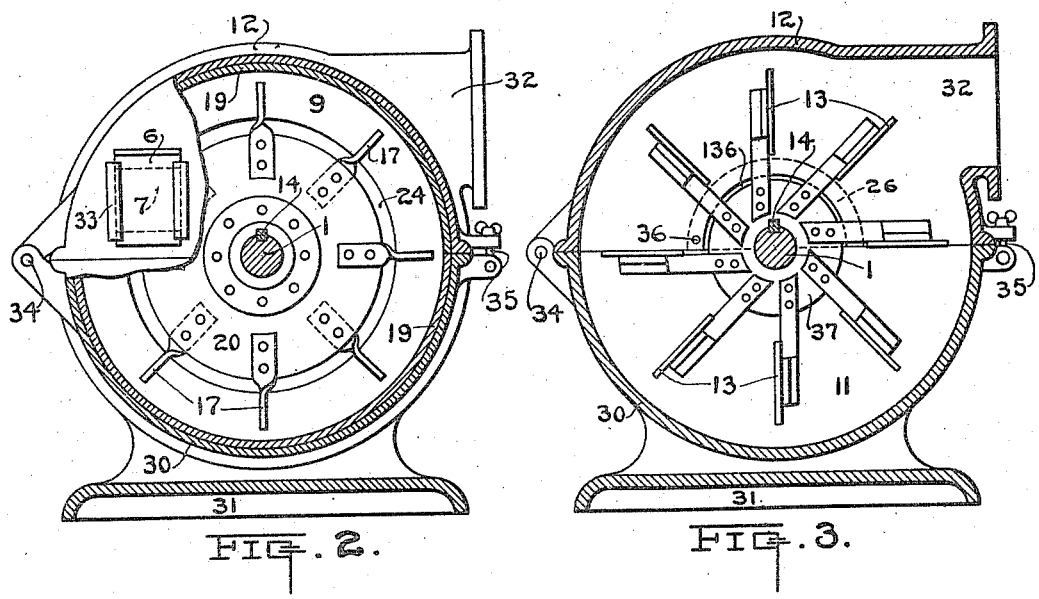

Figure 1 is a central vertical section through the pulverizer, the shaft, bearings, driving pulley and base of the device being shown in elevation. Fig. 2 is a transverse section on the line II—II of Fig. 1, looking in the direction of the arrows, a portion thereof being in end elevation. Fig. 3 is a transverse section through the pulverizer; the section being taken on the line III—III of Fig. 1, looking in the direction of the arrows.

The shaft 1 of the pulverizer, see Fig. 1, is supported in end bearings 3, 28, being held in the bearings 3, 28, by the bearing caps 2, 27, and being prevented from moving endwise by collars 100. The driving pulley 29 is fastened to an overhanging end of the shaft 1, and serves as a driving means for the pulverizer. The bearings 3, 28, are fixed to a common base 31, thus giving rigidity to the structure.

The inclosing casing of the pulverizer is formed concentric with the shaft 1, and is composed of an upper hinged portion 12, and a lower stationary portion 30 fixed to the common base 31. In the construction as shown, see Figs. 2 and 3, the upper portion 12 is connected to the lower portion 30 by means of hinges 34 and clamping bolts 35, thus permitting the upper portion 12 to be swung back on the hinges 34 by disengaging the clamping bolts 35.

The inclosing casing is divided into a series of chambers or compartments 8, 9, 10, 11, by walls which extend from the outer shell of the casing portions 12, 30, toward the shaft 1. The three pulverizing compartments 8, 9, 10, which are nearest the feeder end of the pulverizer, have liners 19 fitted therein concentric with the shaft 1. These liners 19 are formed of perforated wearing material and are removable from the portions 12, 30, for replacement by new ones when worn out.

The feed hopper 4, having the controlling valve 5 therein, has its discharge directed into the first pulverizing compartment 8. Openings 7 which are formed in the end of the upper portion 12 of the casing on either side of the feed hopper 4, constitute atmospheric connections to the compartment 8, see Figs. 1 and 2. These openings 7 are under control of plates 6 which slide under retaining guides 33, the guides 33 being fastened to the portion 12 of the casing.

The beater carrying disk 22 is fixed to the shaft 1 by means of the key 14, within the first compartment 8, the disk 22 being concentric with the shaft 1 and carrying a series of radial beaters 18. A circular opening 23 is formed concentric with the shaft 1 in the wall between the first compartment 8 and the second compartment 9. This opening 23 is of slightly smaller diameter than the beater disk 22.

The second beater carrying disk 20 is fixed to the shaft 1 by means of the key 14 within the second compartment 9, the disk 20 being concentric with the shaft 1 and carrying a series of radial beaters 17. The beaters 17 are narrower and longer than the beaters 18 which are mounted on the first disk 22, thus reducing the clearance between the beaters 17 and the casing. The second compartment 9 is formed considerably wider than the first compartment 8, but of approximately the same diameter. A circular opening 24, which is larger in diameter than opening 23, is formed concentric with the shaft 1, in the wall between the second compartment 9 and the third compartment 10. The second disk 20 is of approximately the same diameter as the first disk 22, and the opening 24 is larger than the disk 20.

The third beater carrying disk 21 is fixed to the shaft 1 by means of the key 14 within the third compartment 10, the disk 21 carrying a series of radial beaters 16. The beaters 16 are narrower and longer than the beaters 17, 18, thus again reducing the clearance between the beaters 16 and the casing. The third compartment 10 is formed wider than, but of about the same diameter as, the preceding compartments 8, 9. A circular opening 15 is formed concentric with the shaft 1 in the wall between the third compartment 10 and the fan compartment 11. The opening 15 is of less diameter than the disks 22, 20, 21.

The fan disk 37 is fixed to the shaft 1 by means of the key 14 within the fan compartment 11, the disk 37 carrying a series of radial fan blades 13. The discharge opening 32 is formed near the top of the fan compartment 11 and is directed tangentially from the casing, see Fig. 3. A semi-circular opening 136 is formed through the fan end of the upper portion 12, and is normally closed by an adjustable cover 26 which swings on a pivot 36 and may be held in any desirable position by clamping the cover 26 to the portion 12 or other suitable means, not shown.

During the operation of the pulverizer, the shaft 1 is given a rapid rotary motion by means of any suitable power applied to the pulley 29, thus causing the beaters 18, 17, 16, and the fan blades 13 to be carried rapidly through a circular path within the corresponding compartments 8, 9, 10, 11. The material to be pulverized, preferably coal, coke or sawdust is then admitted to the first compartment 8 from the hopper 4, the valve 5 controlling the rate of admission.

Upon entering the compartment 8, the material mixes with air drawn into the compartment 8 through the openings 7, the slides 6 being adjusted to any desired position. This mixture of solid material and air is then drawn toward the fan end of the pulverizer by the decrease in pressure at the fan end due to the expulsion of the air from within the pulverizer casing by the fan blades 13. The rapid rotation of these blades 13 causes the air and suspended material to be withdrawn from the compartments 8, 9, 10, through the openings 15, and to be discharged through the opening 23, thus tending to form a vacuum in the compartments 8, 9, 10, 11.

As the entering mixture reaches the first disk 22, it is drawn outward toward the beaters 18, the disk 22 thus acting as a baffle. The reduced pressure on the fan side of the disk 22 causes the mixture to be drawn into the path of the rapidly moving beaters 18, thus partially pulverizing and expanding the solid material and causing this material to be more thoroughly mixed with the mingling air. The mixture of solids and gas is withdrawn from the compartment 8 through the opening 23, being forced toward the shaft 1 by the baffling wall in which the opening 23 is formed. The increase in space between the consecutive disks 22, 20, allows the mixture to expand to about the same density which it possessed before its partial pulverization by the beaters 18.

As the mixture enters the second compartment 9 through the opening 23, it is drawn toward the second disk 20. As the mixture approaches the disk 20, it is drawn outward toward the beaters 17, the disk 20 thus acting as a baffle. The suction produced by the fan blades 13 causes the mixture to pass into the path of the rapidly moving beaters 17 where the solid material contained in the mixture is further pulverized, expanded and mixed with the commingling air. The mixture is withdrawn from compartment 9 through the opening 24, being again forced toward the shaft 1 by the baffling effect of the wall in which the opening 24 is formed. The increase in space between the consecutive disks 20, 21 allows the mixture to expand to about the same density which it possessed before its second partial pulverization by the beaters 17.

Upon entering the third compartment 10 through the opening 24, the mixture is drawn toward the third disk 21. As the mixture approaches the disk 21, it is drawn outward toward the beaters 16, the third disk 21 thus acting as a baffle. The suction produced by the fan blades 13 causes the mixture to be drawn into the path of the rapidly moving beaters 16, where the solid material contained in the mixture is still further reduced and mixed with the commingling air. From the path of the beaters 17, the finely pulverized and well mixed mechanical mixture of coal and air is drawn through the opening 15 into the fan compartment 11.

The mixture before entering the compartment 11, is given an inward direction due to the confinement of the opening 15 to the central portion of the wall through which it is formed. Upon entering the fan compartment 11, the mixture is drawn outward into the path of the rapidly moving fan blades 13, where it is finally reduced to a powder and mixed with the commingling air to form a mechanical gas or highly combustible mixture. As the mixture is carried around by the fan blades 13 it is finally discharged through the discharge opening 32 at the top of the casing.

It is not intended to limit the construction to a three disk pulverizer, as any number of series of beaters might be employed.

The discharge 32 being formed near the top of the fan, is an essential feature of the present construction, as the discharge of mixture will with such a construction be more uniform and regular.

In controlling the amount of air in the mixture, the size of the openings 7 is regulated, thus admitting more or less air as required. If full opening of both openings 7 is not sufficient to allow the required amount of air to enter, the opening 136 at the fan end of the pulverizer may be opened to permit the necessary amount of air to enter.

The use of liners 19 having perforations therein, causes the material to impinge against other than a smooth surface as it is thrown out by the beaters 18, 17, 16, thus aiding the process of pulverization.

It should be understood that it is not desired to be limited to the exact details of construction shown and described, for obvious modifications will occur to a person skilled in the art.

It is claimed and desired to secure by Letters Patent,—

1. In a pulverizer, the combination of a casing divided into chambers, an inlet and an outlet therefor, a shaft, beaters on said shaft in said chambers, said beaters being of decreasing width from inlet to outlet and all being set substantially at the same angle on the shaft, and means for relatively moving said beaters and casing.

2. In a pulverizer, the combination of a casing, an inlet and an outlet therefor, said casing being divided into chambers all of increasing width from said inlet to said outlet, a shaft, beaters on said shaft in said chambers, said beaters being of decreasing width from said inlet to said outlet and all being set substantially at the same angle on the shaft, and means for relatively moving said beaters and casing.

In testimony whereof, I affix my signature in the presence of two witnesses.

JULES H. HIRT.

Witnesses:
  LEON E. HIRT,
  C. CADENA.